(12) United States Patent
Aschoff et al.

(10) Patent No.: US 7,768,168 B2
(45) Date of Patent: Aug. 3, 2010

(54) ELECTRIC MACHINE COMPRISING A PERMANENT MAGNET

(75) Inventors: Joerg Aschoff, Buehl (DE); Thomas Lott, Buehl (DE); Andreas Wehrle, Durbach (DE); Gerd Walter, Rohrwiller (FR)

(73) Assignee: Robert Bosch GmbH, Stuttgart (DE)

( * ) Notice: Subject to any disclaimer, the term of this patent is extended or adjusted under 35 U.S.C. 154(b) by 430 days.

(21) Appl. No.: 10/546,654

(22) PCT Filed: Feb. 20, 2004

(86) PCT No.: PCT/DE2004/000316

§ 371 (c)(1),
(2), (4) Date: Aug. 24, 2005

(87) PCT Pub. No.: WO2004/084376

PCT Pub. Date: Sep. 30, 2004

(65) Prior Publication Data

US 2006/0158053 A1 Jul. 20, 2006

(30) Foreign Application Priority Data

Feb. 26, 2003 (DE) .................. 103 08 142
Jul. 15, 2003 (DE) .................. 103 31 958

(51) Int. Cl.
*H02K 21/12* (2006.01)
*H02K 1/27* (2006.01)

(52) U.S. Cl. ........................ 310/156.22; 310/156.08; 310/156.16; 310/156.27; 310/261.1

(58) Field of Classification Search ............ 310/156.08, 310/261, 91, 156.16, 156.22, 156.27
See application file for complete search history.

(56) References Cited

U.S. PATENT DOCUMENTS

| 1,996,946 | A | * | 4/1935 | Beeh | 310/156.51 |
| 3,019,359 | A | | 1/1962 | Crommen | |
| 3,909,647 | A | * | 9/1975 | Peterson | 310/156.12 |
| 4,472,650 | A | * | 9/1984 | Advolotkin et al. | 310/156.16 |
| 4,477,744 | A | | 10/1984 | Gerber | |
| 4,510,409 | A | * | 4/1985 | Kanayama | 310/268 |
| 4,543,506 | A | * | 9/1985 | Kawada et al. | 310/156.59 |
| 4,667,123 | A | | 5/1987 | Denk et al. | |
| 4,672,250 | A | * | 6/1987 | Seitz | 310/90 |
| 4,745,319 | A | | 5/1988 | Tomite et al. | |
| 4,908,535 | A | * | 3/1990 | Kreuzer et al. | 310/45 |
| 5,483,116 | A | | 1/1996 | Kusase et al. | |
| 5,574,323 | A | * | 11/1996 | Nusser | 310/156.22 |

(Continued)

FOREIGN PATENT DOCUMENTS

DE 1092113 11/1960

(Continued)

*Primary Examiner*—Quyen Leung
*Assistant Examiner*—Alex W Mok
(74) *Attorney, Agent, or Firm*—Ronald E. Greigg

(57) ABSTRACT

The present invention relates to an electrical machine having a rotor, a stator, and a permanent magnet located on the rotor. The permanent magnet is embodied essentially as a hollow cylinder with axial and/or radial contact faces and is secured to the rotor at the axial and/or radial contact faces by means of retaining elements; the permanent magnet is elastically supported in the axial direction (X-X) and/or the radial direction of the rotor by means of the retaining elements.

18 Claims, 14 Drawing Sheets

U.S. PATENT DOCUMENTS

| | | | |
|---|---|---|---|
| 5,596,238 A | * | 1/1997 | Milnikel .................... 310/103 |
| 5,793,144 A | | 8/1998 | Kusase et al. |
| 5,925,964 A | | 7/1999 | Kusase et al. |
| 6,047,461 A | * | 4/2000 | Miura et al. .................. 29/598 |
| 6,282,053 B1 | | 8/2001 | MacLeod et al. |
| 2001/0048261 A1 | | 12/2001 | Kojima et al. |

FOREIGN PATENT DOCUMENTS

| | | | |
|---|---|---|---|
| DE | 3021607 A1 | | 12/1981 |
| DE | 44 01 847 A1 | | 7/1995 |
| EP | 1075073 A1 | | 2/2001 |
| FR | 2 723 490 A1 | | 2/1996 |
| JP | 60152239 A | | 8/1985 |
| JP | 03007035 A | * | 1/1991 |
| JP | 200069719 A | | 3/2000 |
| JP | 200145703 A | | 2/2001 |
| JP | 2001178039 A | | 6/2001 |

* cited by examiner

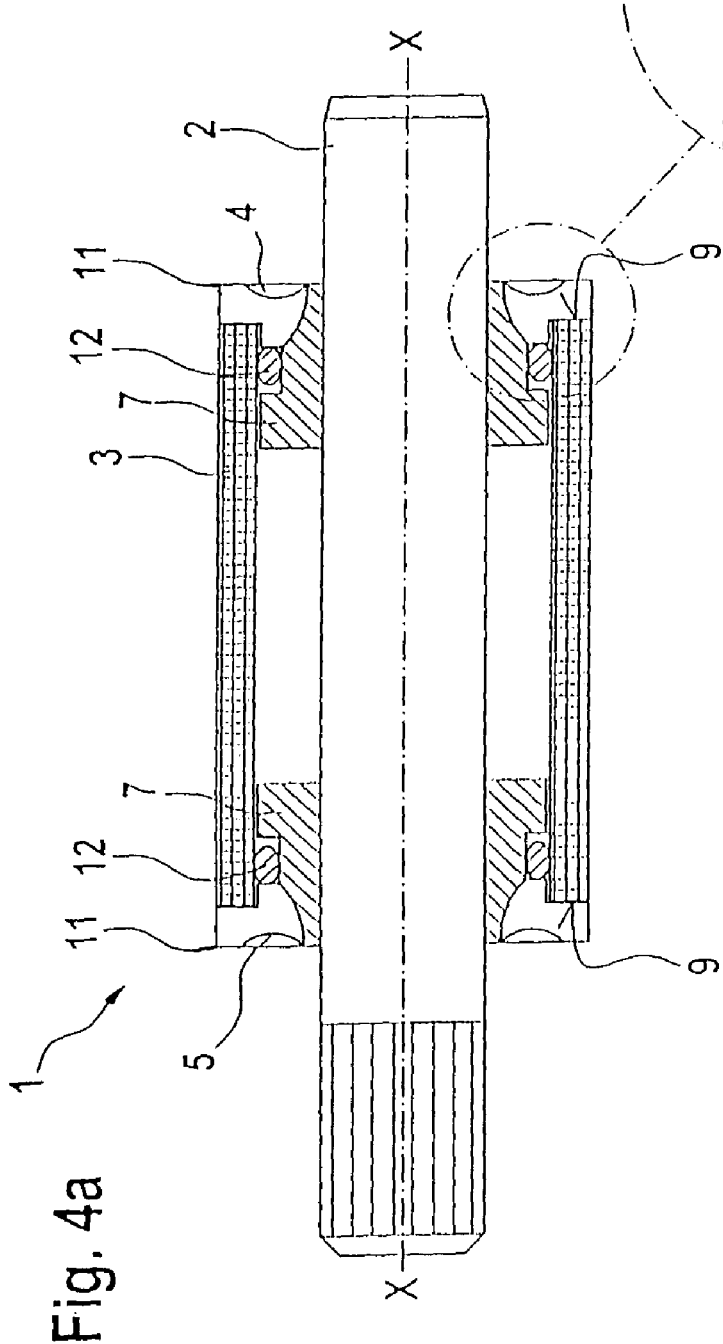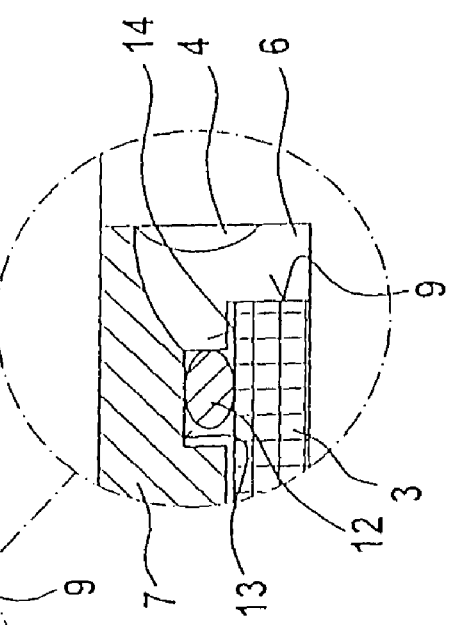

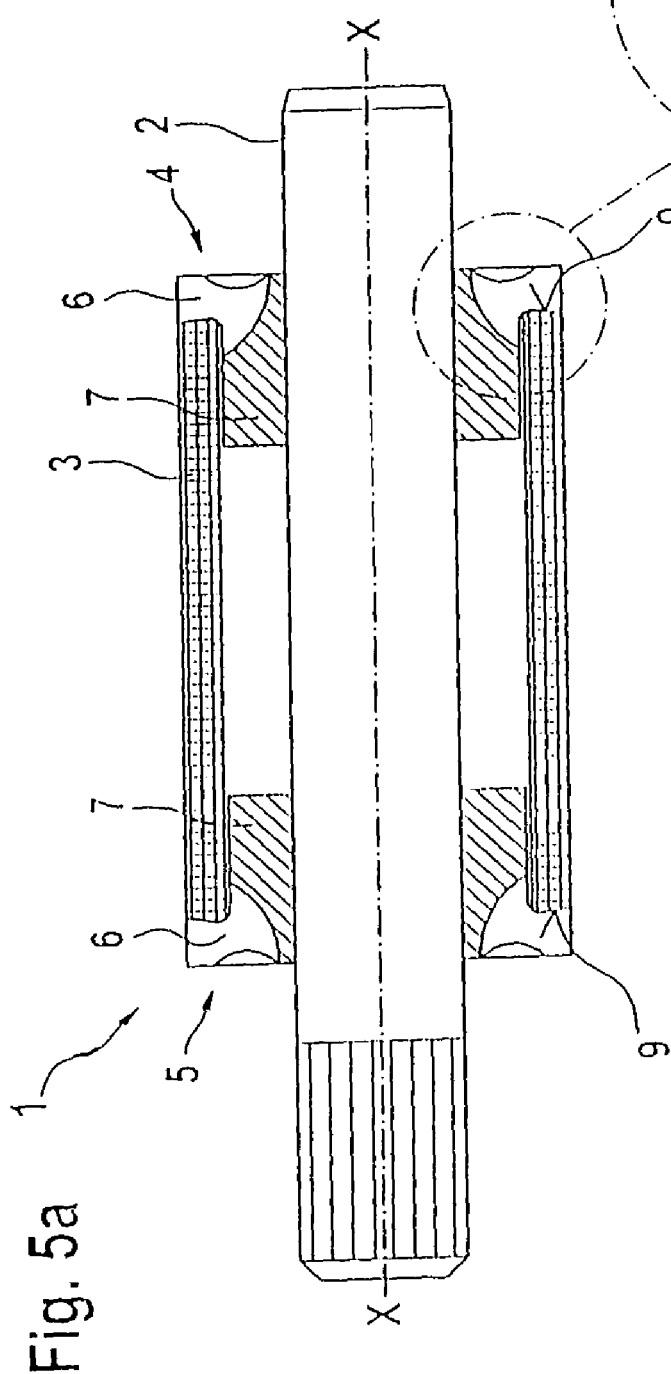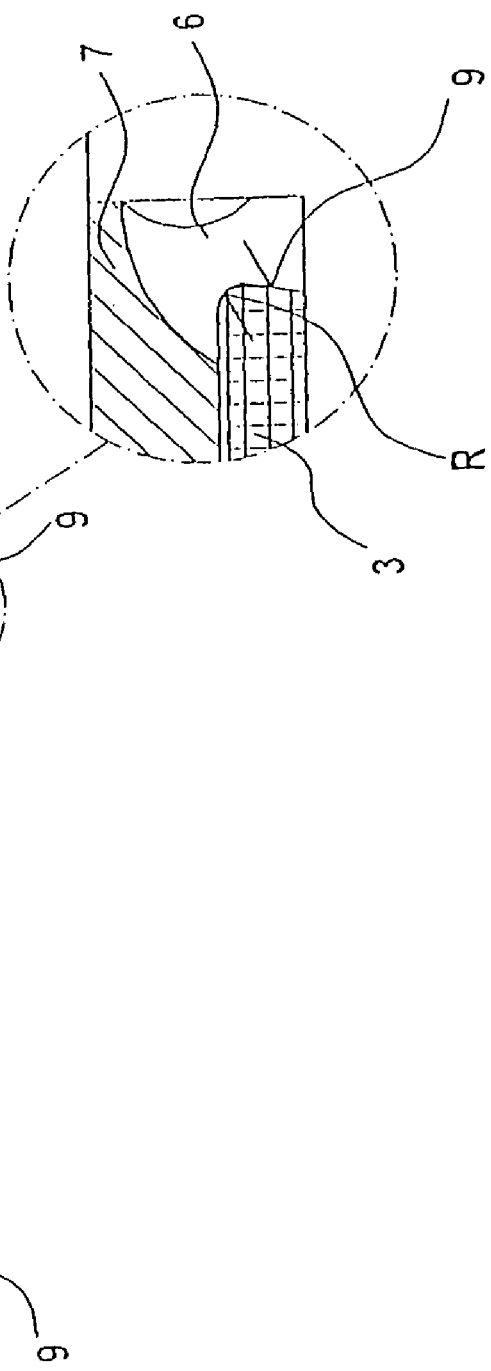
Fig. 5a
Fig. 5b

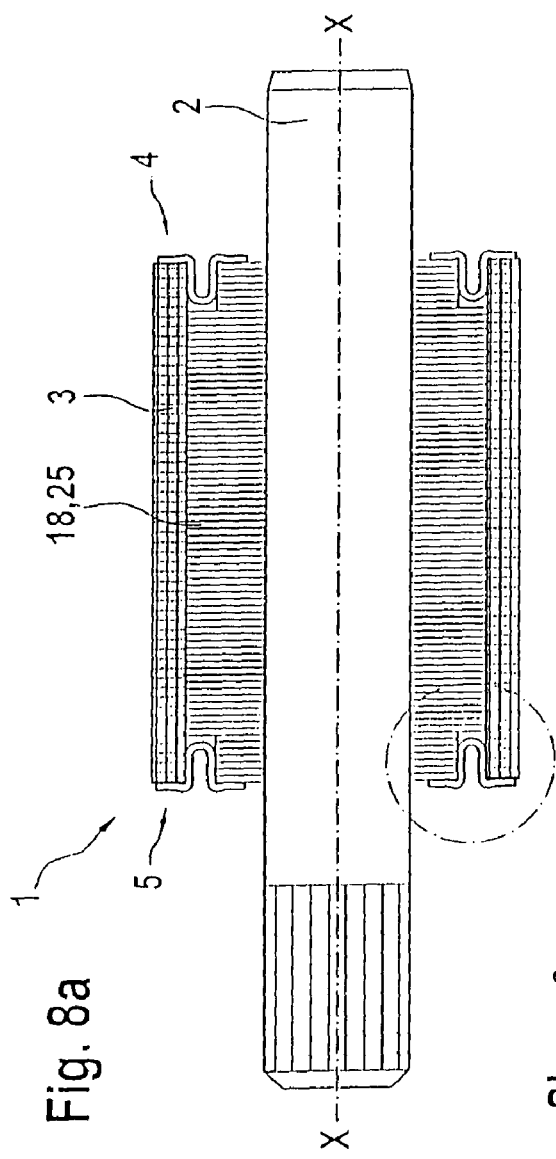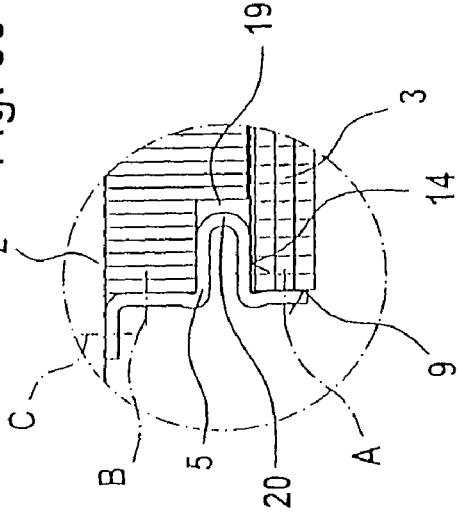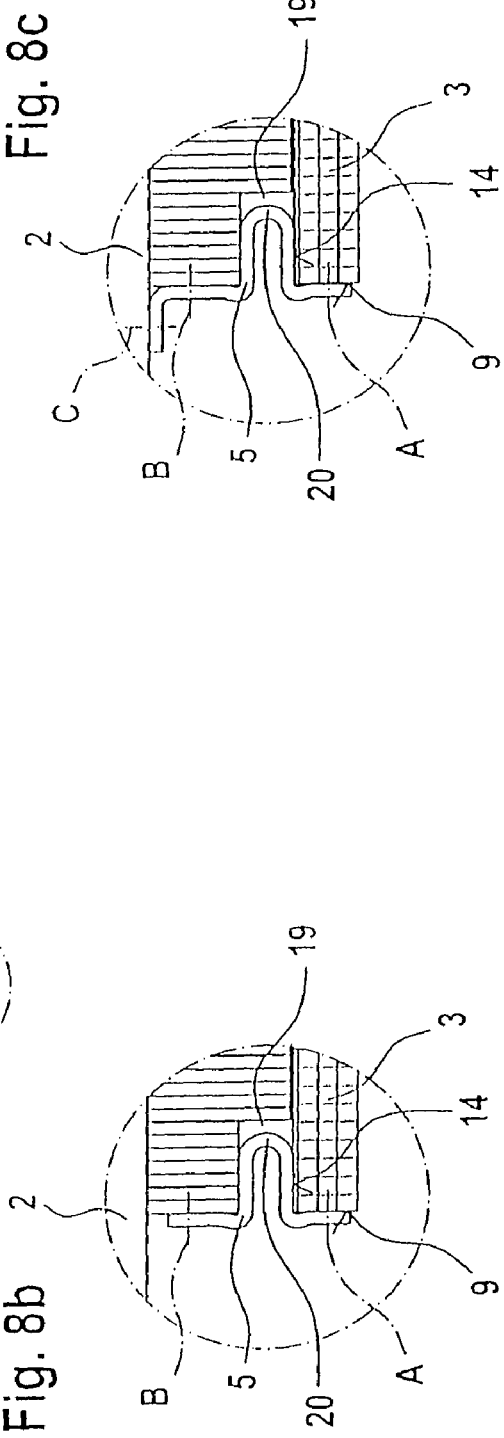

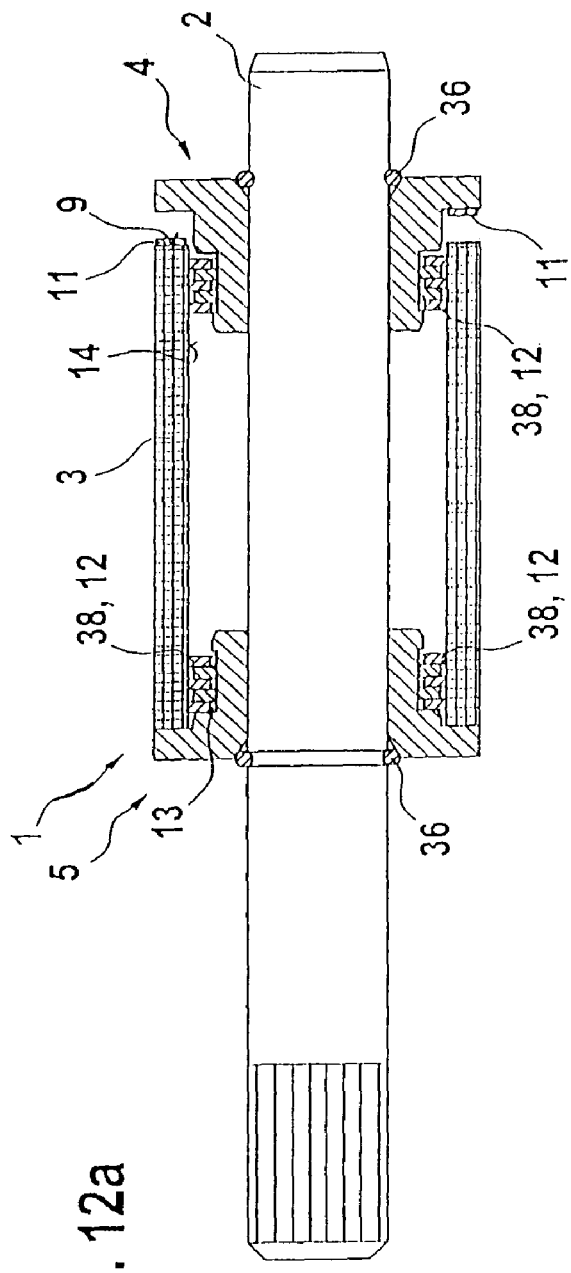
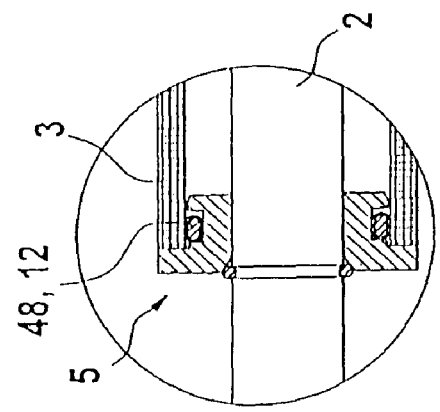
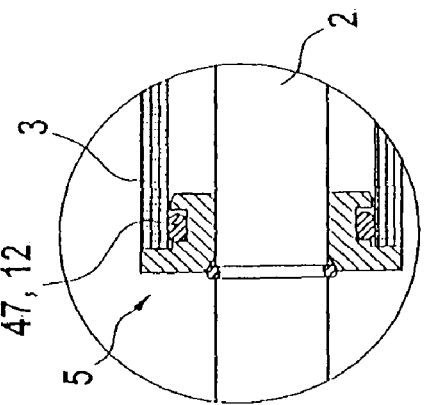
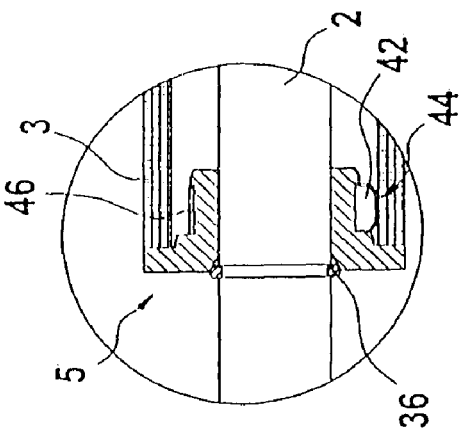
Fig. 12a
Fig. 12d
Fig. 12c
Fig. 12b

ELECTRIC MACHINE COMPRISING A PERMANENT MAGNET

CROSS-REFERENCE TO RELATED APPLICATIONS

This application is a 35 USC 371 application of PCT/DE 2004/000316 filed on Feb. 20, 2004.

BACKGROUND OF THE INVENTION

1. Field of the Invention

This invention relates to an improved electrical machine, and more particularly to such a machine having a rotor, a stator, and a permanent magnet located on the rotor.

2. Description of the Prior Art

Electrical machines are well known from the prior art. For instance, permanent magnetically excited direct current motors are known that can be commutated electronically or mechanically. A distinction can be made between two kinds of embodiment, namely one in which the permanent magnets are located on the stator, and another in which the permanent magnets are mounted on the rotor. The commutated magnetic field between the permanent magnets and the coils disposed on the other component generate the torque on the rotor shaft.

For securing the permanent ring magnet to a rotor body of the rotor shaft, it is known for instance from European Patent Disclosure EP 0 872 945 A1 to use an adhesive bond. Because of the different coefficients of expansion in response to temperature of the various materials comprising the magnet, adhesive, and rotor body, and because of production variations and because of the requisite spacing, when an adhesive is used, between the magnet and the rotor shaft/body, major stresses in the various materials (magnet, adhesive, shaft) occur at the bonded faces, on the one hand. On the other, however, during operation of the electrical machine major temperature differences can occur, which because of the different coefficients of expansion of the materials causes cracks, to the extent of breakage of material, so that it is no longer possible to transmit torque from the magnet to the rotor shaft. Furthermore, the mechanical properties of the adhesive become poorer as the temperature rises. At this time, the adhesive is the most-critical link in the entire chain.

SUMMARY AND ADVANTAGES OF THE INVENTION

The electrical machine of the invention has the advantage over the prior art that a permanent magnet can be retained on the rotor without play, concentrically to the rotor shaft. This is possible by means of the retaining elements of the invention, which elastically support contact faces of the permanent magnet that are located in the axial direction and/or the radial direction of the rotor. Thus temperature-caused changes in length of the various materials can be compensated for by the elastic support of the permanent magnet on the retaining elements, without resulting in cracks or breakages of material. Another advantage of fastening the permanent magnet between two retaining elements located on its two ends is that for transmitting torque, both ends of the permanent magnet are used, so that the torque transmission from the permanent magnet is effected to the rotor shaft via the retaining elements. Moreover, because the permanent magnet is elastically supported on both sides according to the invention, any production variations that may occur can also be compensated for. Hence complicated, expensive fine machining of the axial and radial contact faces of the permanent magnet, in particular, can be dispensed with.

Advantageous refinements of the invention are disclosed. Preferably, the retaining elements each have an integrally formed resilient region. Preferably, the resilient regions are located on the outer circumference, in terms of the radial direction of the retaining element, in order to support the axial contact faces of the permanent magnet. The retaining element may for instance be embodied like a cup spring, or it is also possible for slits extending in the radial direction to be provided, for instance, in order to form separate spring elements.

To enable radial centering of the permanent magnet with respect to the rotor shaft in addition to the axial elastic support of the permanent magnet, the contact faces of the permanent magnet are preferably embodied in tapering form. Another possibility of elastic support in the radial direction of the rotor can be implemented by using spring elements that are located between the rotor and the inside circumference of the permanent magnet. The spring elements rest on radial contact faces of the permanent magnet. This can be accomplished for instance by means of a centering sleeve that is slit at multiple places.

An axial contact face of the retaining element, which in the installed state is in contact with the permanent magnet, also preferably has a predetermined radius, so that as much as possible, only an essentially linear contact exists between the retaining element and the permanent magnet.

Preferably, an additional friction element, such as a felt material or the like, is located between the permanent magnet contact faces and the retaining element. As a result, friction between the two components can be increased, making it possible to transmit a greater torque. Moreover, it proves advantageous to position a closed disk between the magnet and the spring-elastic element. The disk prevents tensile stresses, caused by widening of the spring-elastic element, from being transmitted to the magnet and bursting it. The disk can furthermore preferably have a friction-increasing coating.

To assure an especially long service life of the electrical machine, wear-resistant and/or friction-increasing coatings are provided on the retaining element or the permanent magnet or both. The retaining element of the invention can be furnished especially economically by using spring steel. The retaining element can be connected to the rotor shaft for instance by means of laser welding, shrink fits, embossing on a collar, and so forth. To that end, the retaining element is preferably embodied in the form of a cuff, with resilient regions. The resilient regions may be embodied integrally with the retaining element in such a way that both resilient regions for furnishing a spring force in the axial direction and resilient regions for furnishing a spring force in the radial direction are provided.

Also preferably, the permanent magnet is produced by means of sintering and has the shape of a hollow cylinder. As a result, the permanent magnet can be furnished very economically. Since a sintered permanent magnet can absorb major compressive forces very well but can absorb only slight tensile forces, it is especially well suited for fastening between the two retaining elements of the invention.

The electrical machine of the invention is preferably used in EC motors with a closed multipole ring magnet, so that in particular, the disadvantageous adhesive bonding of the magnet to the rotor as in the prior art no longer has to be done. For mounting the retaining elements on the rotor shaft, hollow dies oriented counter to one another can preferably continue to be used. Suitable gauges on the hollow dies may preferably be embodied in order to set or adjust a predetermined initial tension via the retaining elements on the magnets by means of the positioning of the retaining elements. This initial tension can be determined for instance from a degree of bending of the resilient regions of the retaining element.

In a further embodiment, the permanent magnet ring is supported only by the radial contact pressure of the centering elements of the retaining elements. Here, axial spring elements can advantageously be dispensed with. If the centering elements have a very shallowly extending, virtually linear spring characteristic curve, then the radial force on the permanent magnet ring remains virtually constant even with relatively long spring travel distances for compensating for heat expansion or production variations. This protects the permanent magnet against destruction, since it is especially vulnerable to a radial exertion of force. The embodiment of the centering element can therefore be adapted to the spring travel distance that occurs for a particular application.

An especially long linear friction face with a shallow characteristic curve can be attained with a spiral spring with radially offset loops, since its total outside diameter can be made greater by a factor of up to two than its resultant inside diameter, and as a result, a uniform radial force on the ring magnets can be exerted over a wide radial range.

Because of the embodiment of radial extensions on the centering element, the permanent ring magnet can easily be mounted in assembly and then the centering element can be stiffened by pressing against it by means of an axial spring element, thereby reducing the radial vibrations of the ring magnet.

The embodiment of the retaining elements is quite variable and may be adapted to given operating conditions. For instance, the retaining elements may be embodied as two separate components, which directly and elastically support the ring magnet axially and/or radially. In a further version, these retaining elements may instead be integral components of a rotor body, and the rotor body can for instance be embodied as a magnetic short-circuit element. Such a short-circuit element also permits magnetization of the ring magnets in the radial direction, while conversely, in magnetization inside the jacket face plane, a short-circuit element is necessary. The retaining elements may also be embodied as multi-part components, so that a basic body of the retaining element has further radial and/or axial elastic elements or means for securing them to the base body or to the rotor shaft. Not only the separate retaining elements but also the retaining elements integrated with the rotor body may be secured to the rotor shaft in a simple way by means of known joining techniques, for instance by means of securing rings, laser welding, or press fitting.

The retention of the permanent magnet ring solely via elastic elements is suitable for attaining a friction coupling of the torque transmission. As a result, for instance when a sensor signal is picked up directly from the working magnet, it is possible to prevent the destruction of gear parts on the power takeoff side if excessive torques occur. The torque limit value can be established by means of the design of the axial and radial spring elements as well as of the friction face between them and the permanent ring magnet.

BRIEF DESCRIPTION OF THE DRAWINGS

The invention is more fully described herein below, in conjunction with the drawings, in which:

FIGS. 4a and 4b are schematic sectional views of a rotor in a third exemplary embodiment of the present invention;

FIGS. 5a and 5b are schematic sectional views of a rotor in a fourth exemplary embodiment of the present invention;

FIGS. 8a through 8f are schematic sectional views of a rotor in a seventh exemplary embodiment of the present invention, with FIGS. 8c through 8f showing variants thereof;

FIGS. 12a through 12d are schematic sectional views of further exemplary embodiments, with centering elements;

DESCRIPTION OF THE PREFERRED EMBODIMENTS

Figure 2:
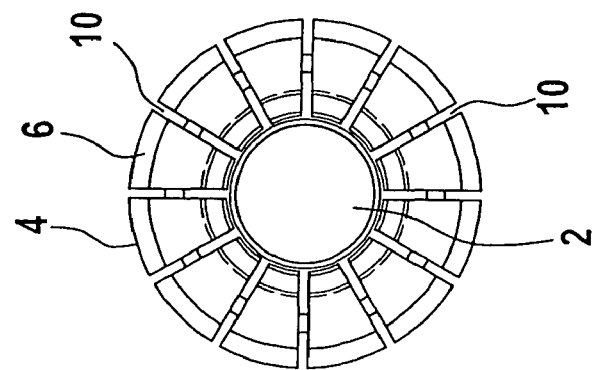
FIG. 2 is an end view of the rotor shown in FIG. 1.
Figure 1:
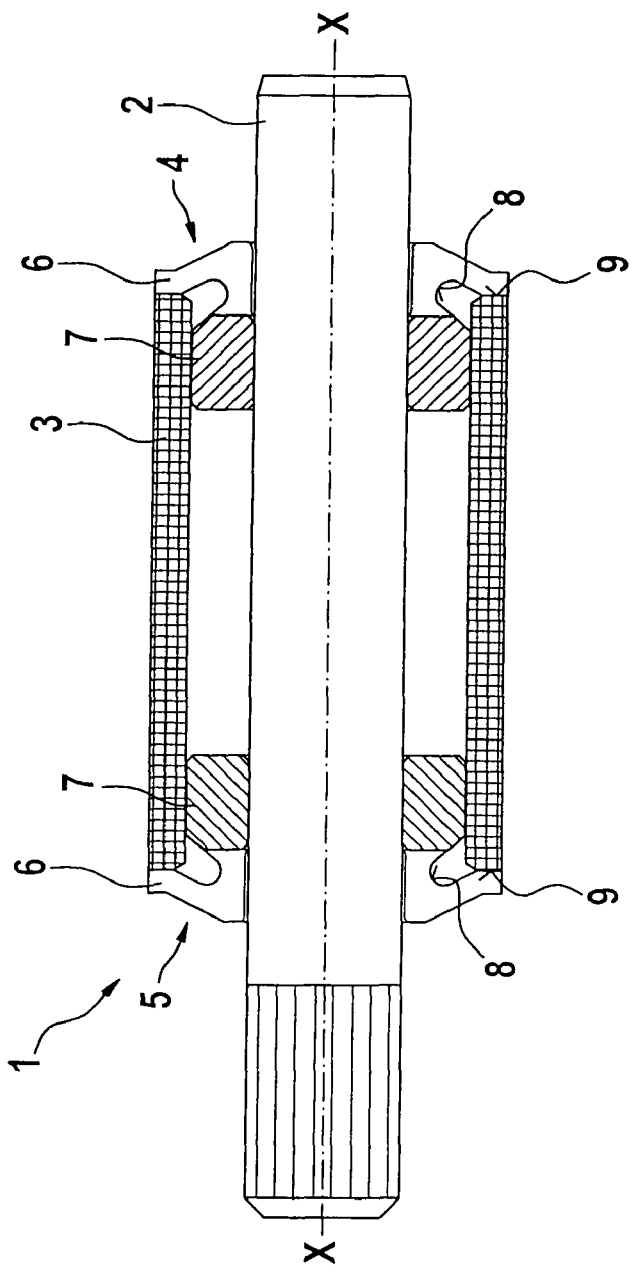
FIG. 1 is a schematic sectional view of a rotor of an electrical machine in a first exemplary embodiment of the present invention.

An electrical machine will now be described in accordance with a first exemplary embodiment of the invention, in conjunction with FIGS. 1 and 2. FIG. 1 shows a rotor 1, which includes a rotor shaft 2 and a permanent magnet 3. The permanent magnet 3 is secured to the rotor shaft 2 by means of two retaining elements 4, 5. The permanent magnet 3 is made from a sintered material and has an essentially hollow-cylindrical shape. On its ends located in the axial direction X-X, the permanent magnet 3 has a contact face 9 that is perpendicular to the axis X-X.

The retaining elements 4 and 5 are embodied identically, and each includes both a resilient region 6 and a retention region 7. The retention region 7 is embodied essentially annularly and is secured to the rotor shaft 2 by means of a press fit, for instance. The retaining elements 4, 5 are made from a spring steel, for instance. The elastic portion of the retaining elements 4, 5 comprises many spring elements 6 that are separated from one another by respective slits 10 (see FIG. 2). To furnish a relatively strong spring force in the axial direction X-X, a throat 8 is embodied on each spring element. It should be noted that the slits are not absolutely compulsory. The slits bring about a reduction in rigidity compared to an unslit spring element.

As can be seen from FIG. 1, the permanent magnet 3 is fastened between the two retaining elements 4 and 5, producing a friction lock between the permanent magnet and each of the retaining elements 4, 5, in order to transmit the torque to the shaft 2. Since the retaining elements 4, 5 are located on both ends of the permanent magnet 3, a compensation for a change in length may occur from the effects of heat is distributed uniformly to both retaining elements 4, 5. A further advantage is that complicated postmachining of the permanent magnet 3 is unnecessary, since any variations that occur can be compensated for by the elasticity of the retaining elements 4, 5. Thus the permanent magnet 3 can be manufactured especially economically, with a short production time.

The axial contact faces 9 of the permanent magnet 3 engaging the retaining elements 4, 5 should have a coefficient of friction that is as high as possible, so that the axial force on the partners in the friction can be selected to be as low as possible. The permanent magnet 3 is supported elastically in the axial direction.

Figure 3:
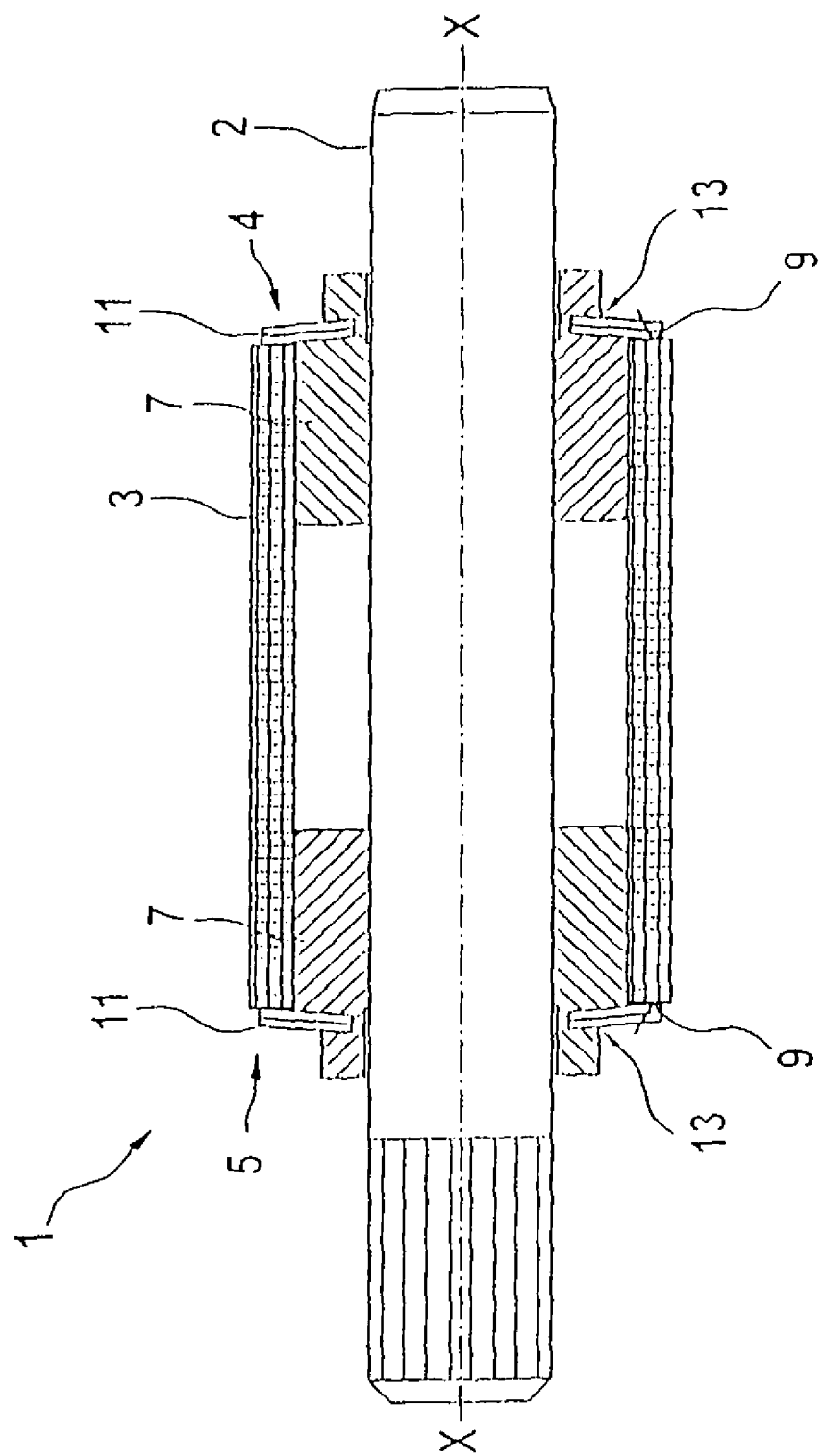
FIG. 3 is a schematic sectional view of a rotor in a second exemplary embodiment of the present invention.

A rotor will now be described in conjunction with FIG. 3, in terms of a second exemplary embodiment of the present invention. As shown in FIG. 3, the retaining elements 4, 5 in the second exemplary embodiment are not in one piece, as in the first exemplary embodiment, but instead are formed of two individual parts. More precisely, cup springs or axial spring elements 11 are provided in the retention regions 7 of the retaining elements 4, 5, so as to axially hold the permanent magnet 3 between them. The axial contact face 9 of the permanent magnet 3 is again embodied perpendicular to the axial axis X-X. Here, the retaining elements 4, 5 of the second exemplary embodiment can be furnished especially economically, since the preferably non-magnetizing cup springs 11 can be procured as standard components and can be secured in an annular groove or recess 13 in the retaining elements 4, 5. Radial centering of the permanent magnet 3 is effected by the outer jacket faces of the retention regions 7. Otherwise, this exemplary embodiment is equivalent to the first exemplary embodiment, so that the description of the latter may be referred to.

In conjunction with FIGS. 4a and 4b, a rotor 1 in a third exemplary embodiment of the present invention will now be described. FIG. 4b shows an enlarged detail of FIG. 4a. The third exemplary embodiment corresponds substantially to the first exemplary embodiment; once again, the axial spring elements 11 with the resilient regions 6 are embodied integrally with the retaining elements 4, 5. The contact face of the retaining elements 4, 5 contacting the permanent magnet 3 is formed with a radius R, so that a substantially linear region of contact is formed between the resilient regions 6 and the retaining elements 4, 5 on the one hand and the perpendicular, axial contact face 9 of the permanent magnet on the other. As a result, the Hertzian stress, in particular, between the two components is reduced. Moreover, in the third exemplary embodiment, a centering ring 12 is provided, as a separate component of the retaining elements 4, 5, and is located in a recess 13 in the retention region 7 of the retaining elements 4, 5. The centering ring 12 is made from an elastic material, such as rubber, or an elastic plastic or an elastic metal and serves to center the permanent magnet 3 relative to the axis X-X. The centering ring 12 rests on a radial contact face 14 formed on the inside circumference of the permanent magnet 3. Otherwise, this exemplary embodiment corresponds to the exemplary embodiments described above, and therefore the description of those may be referred to.

A rotor in a fourth exemplary embodiment of the present invention is illustrated in FIGS. 5a, and in 5b which shows an enlarged detail of FIG. 5a. The rotor 1 of the fourth exemplary embodiment corresponds substantially to that of the first exemplary embodiment; in a distinction, to reduce the axial compressive forces, a radius R is embodied on both the resilient region or spring element 6 and on the contact face 9 of the permanent magnet 3. The result is a reduction in the Hertzian stress. The radius R reduces the peak mechanical stresses that act on the retaining element 4, 5. Preferably, the two radii are of equal length and are located in the same direction, so that centering of the permanent magnet 3 with respect to the axis X-X is also effected via the resilient regions 6 of the retaining elements 4, 5.

Because of the tapering embodiment of the contact face 9 of the permanent magnet 3 and of the contact face of the retaining elements 4, 5, it is possible to position and center the permanent magnet in both the axial direction and the radial direction. The contact faces inclined relative to the axial axis X-X thus make a dual function possible with respect to centering the permanent magnet. However, it should be noted that to reduce the Hertzian stress, the radii may also be selected to be different, thereby achieving a reduction in wear at the contact faces, reducing the risk of breakage of the magnet, and reducing peak pressures and material fatigue. Especially preferably, the radius at the contact face 9 of the permanent magnet 3 is selected to be greater than the radius R of the resilient region. It should also be noted that the contact faces between the permanent magnet and the resilient regions 6 may also be embodied as a cone or as tapering in some other way, for instance.

Figure 6:
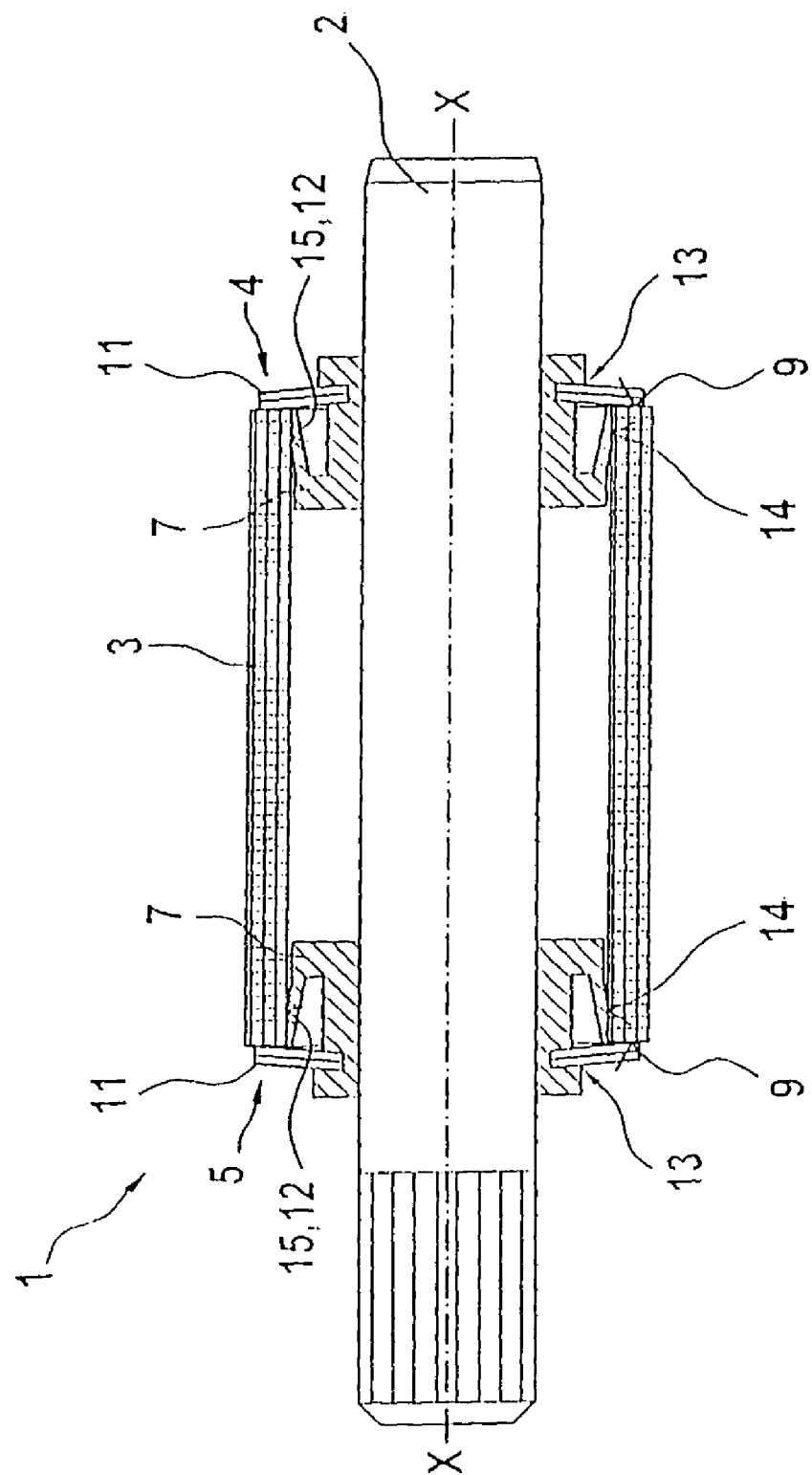
FIG. 6 is a schematic sectional view of a rotor in a fifth exemplary embodiment of the present invention.

A rotor of a fifth exemplary embodiment of the present invention will now be described, referring to FIG. 6. The fifth exemplary embodiment is similar to the second exemplary embodiment. For axial centering, the retaining elements 4, 5 have cup springs 11, which engage vertical contact faces 9 on the permanent magnet 3. For radial centering of the permanent magnet 3, a spring bush 15 formed integrally with the retention region 7 is embodied as a centering element 12, which rests on a radial contact face 14 formed on the radial inside of the permanent magnet 3. The spring bush 15 may for instance be slit in multiple places, so that there are many individual spring elements for centering the permanent magnet 3. Thus a simultaneous elastic support in the axial and radial direction can be furnished in a simple way.

Figure 7:
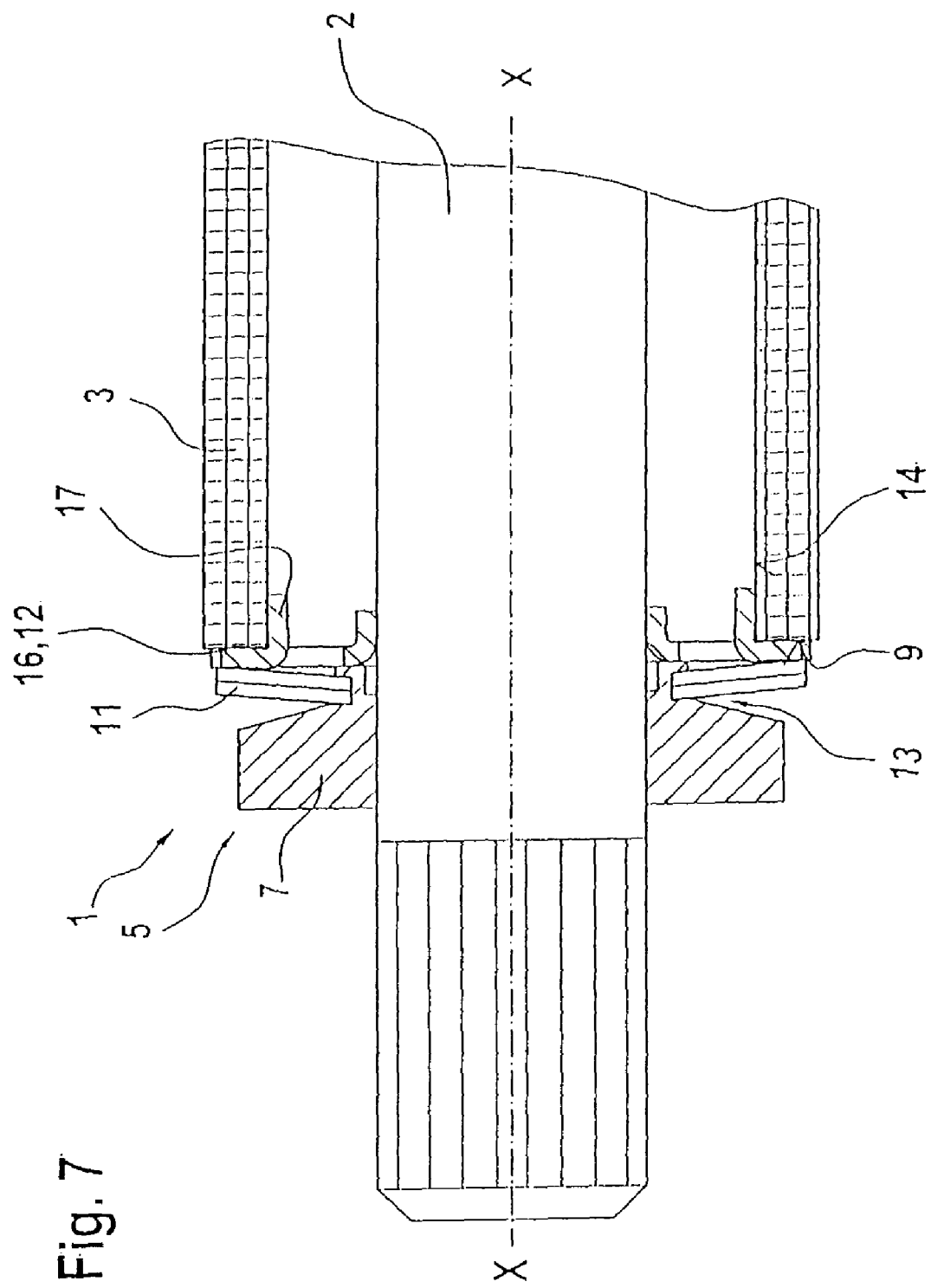
FIG. 7 is a schematic sectional view of a rotor in a sixth exemplary embodiment of the present invention.

FIG. 7 shows a rotor in a sixth exemplary embodiment of the present invention. Similarly to the rotor of FIG. 6, the rotor 1 of this exemplary embodiment has a dual function of centering the permanent magnet 3 in both the axial direction and the radial direction. For centering in the axial direction, axial spring elements 11 are provided, which are located in an encompassing groove 13 in the retention region 7 of the retaining element 5. A separate intermediate element, as a centering element 12 of the retaining element 4, is also located between the cup spring 11 and the contact face 9 of the permanent magnet 3. The intermediate element 16 has a plurality of stamped-out, bent-over resilient regions 17, which are in contact with the radial contact face 14 of the permanent magnet 3. The resilient regions 17 serve to center the permanent magnet 3 radially. The intermediate element 16 is preferably made from a spring steel and is connected to the rotor shaft 2 by means of a press fit. Thus the rotor 1 shown in FIG. 7 likewise furnishes simultaneous centering of the permanent magnet 3 in both the axial and radial directions.

FIGS. 8a through 8f show a rotor 1 in a seventh exemplary embodiment of the present invention; FIGS. 8c through 8f show variants of the embodiment shown in FIGS. 8a and 8b. As can be seen from FIG. 8a, the rotor 1 in the seventh exemplary embodiment includes a rotor shaft 2, on which a rotor lamination packet 18, which serves the purpose of magnetically short-circuiting the permanent magnet 3, is located annularly as a rotor body 25. A permanent magnet 3 is embodied as a hollow cylinder and is located radially outside the rotor lamination packet 18. The permanent magnet 3 is resiliently supported in both the axial direction X-X and the radial direction by means of two elastic retaining elements 4 and 5, located on its ends pointing in the axial direction. The elastic retaining elements 4, 5 may alternatively be described as a component (axial spring elements 11, centering elements 12) of an overall retaining part (4, 5) that includes the rotor body 25.

The retaining elements 4 and 5 are made from spring sheet metal and may be embodied as a retaining element extending annularly all the way around, or as a plurality of separate retaining elements. In the form shown in FIGS. 8a and 8b, one recess 19 is embodied on each of two axial ends of the rotor lamination packet 18. The retaining element 5 is solidly joined to the permanent magnet 3 in a region A and is solidly joined to the rotor lamination packet 18 in a region B. For connection between the retaining element 5 and the permanent magnet 3 or the rotor lamination packet 18, various methods may be employed, such as adhesive bonding, friction welding, contact welding, laser welding, and so forth.

As can be seen particularly from FIG. 8b, the retaining element 5 is embodied such that it has a resilient region 20 of U-shaped cross section, which is located essentially in the recess 19. The permanent magnet 3 rests loosely on the outside of the resilient region 20. In the same way, the resilient region 20 rests loosely on the rotor lamination packet. As a result, the retaining element 5 can enable a resilient support in both the axial direction X-X and the radial direction of the rotor shaft 2.

In the variant shown in FIG. 8c, the retaining element 5 is additionally joined directly to the rotor shaft 2 in a region C. As a result, the rotor lamination packet 18 is additionally fixed relative to the rotor shaft 2.

Figure 8D:
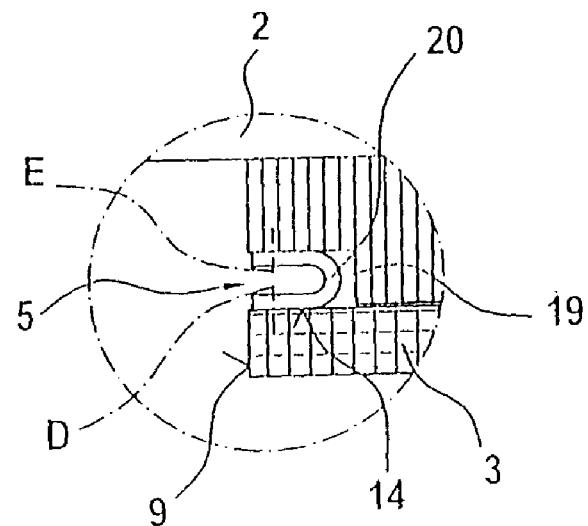

In the variant shown in FIG. 8d, the retaining element 5 comprises only the U-shaped resilient region 20. In the regions D and E, the retaining element 5 is joined to the permanent magnet 3 and the rotor lamination packet 18, respectively. This variant is especially economical and advantageous if only slight demands are made in terms of temperature and torque transmission.

Figure 8E:
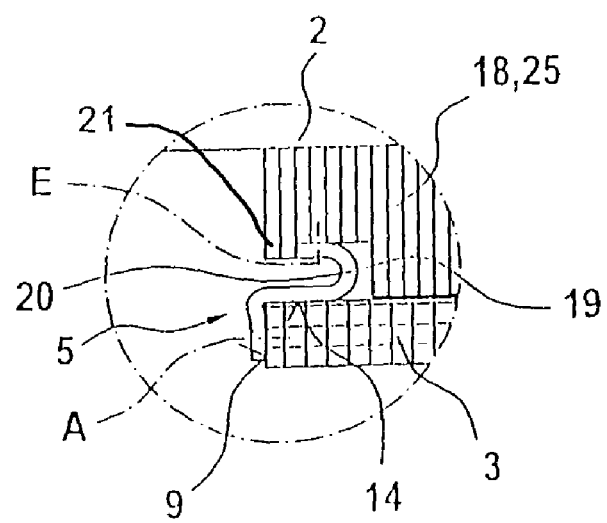

In the variant shown in FIG. 8e, the retaining element 5 is fixed to the rotor lamination packet 18 at in region E. On the rotor lamination packet 18, there is also a protrusion 21, which furnishes a form-locking connection. It may also be provided that the protrusion 21 projects partway past the retaining element 5, to provide security against loosening of the retaining element 5 from the rotor lamination packet 18.

Figure 8F:
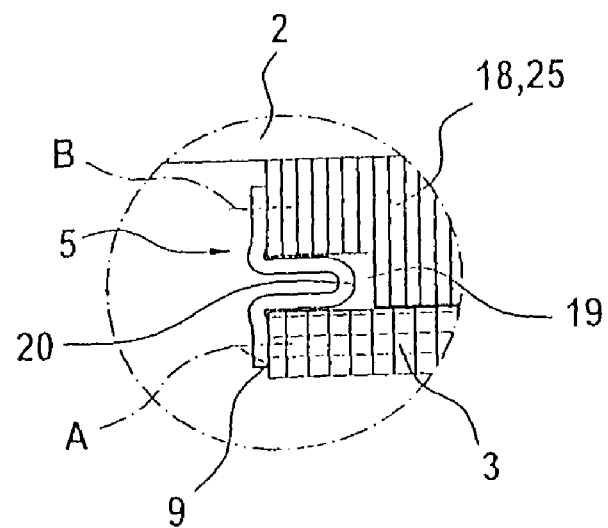

In the variant shown in FIG. 8f, the retaining element 5 is solidly joined to the permanent magnet 3 over a connecting region A, and the rotor lamination packet 18 is solidly joined to the retaining element 5 over a region B. The variant shown in FIG. 8f is quite similar to that shown in FIG. 8b, but the variant of FIG. 8f differs in that the resilient region 20 of U-shaped cross section does not touch the permanent magnet 3 or the rotor lamination 18. As a result, an additional degree of freedom with regard to assembly is obtained, and dimensional variations that may occur in manufacture of the individual components can be compensated for more simply. In particular, in this exemplary embodiment, complicated post-machining of the inside circumference of the permanent magnet 3 can be dispensed with, since the variations in the inside diameter do not affect the overall concentricity of the rotor.

Figure 9:
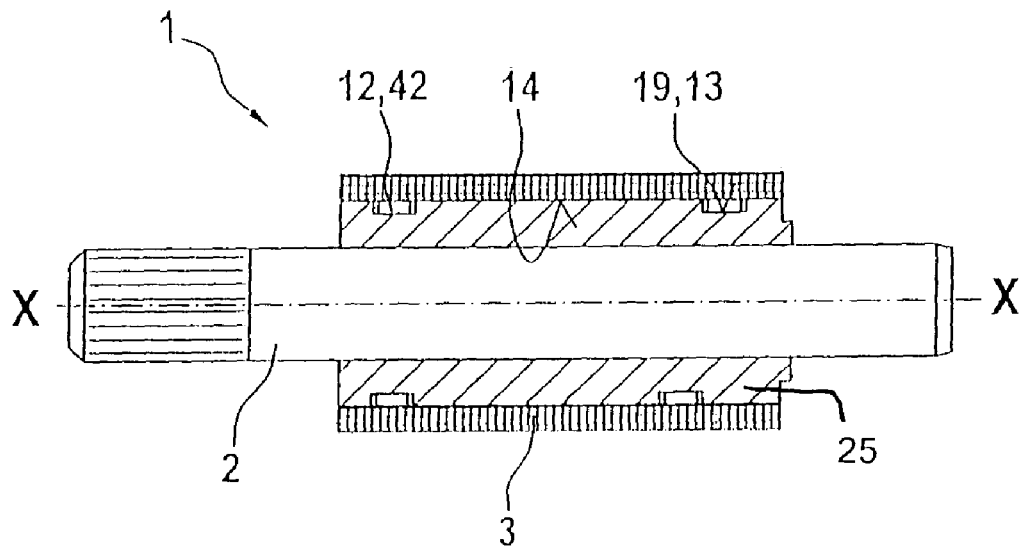
FIG. 9 is a schematic sectional view of a further exemplary embodiment of the invention, with a rotor body.

FIG. 9 shows a rotor 1 with a rotor body 25, rotated on a rotor shaft 2 in a manner fixed against relative rotation, whose coefficient of expansion differs from that of the permanent magnet ring 3. The inside diameter of the permanent magnet ring 3 and the outside diameter of the rotor body 25 are dimensioned to suit a minimum play between the rotor body 25 and the magnet ring 3 in the least favorable range of variations and operating temperature of the rotor 1. The permanent magnet ring 3 in this exemplary embodiment is fixed on the rotor body 25 solely by radial centering elements 12, because the centering elements 12 press against the radial contact faces 14 of the ring magnet 3 with a predetermined pressing force. By means of these radial pressing forces, an unwanted axial displacement of the magnet ring 3 is also prevented. Thus in this exemplary embodiment, the rotor body 25 along with the centering elements 12 acts as a retaining element 4, 5, with which the two retaining elements 4, 5 of FIG. 1 are integrated. The centering elements 12 are supported in recesses 19 in the rotor body 25 and are embodied for instance as a wavy tolerance ring 42, a wire spring, or lamination springs. The centering elements 12 have a flat spring characteristic curve 50 (FIG. 14) in the radial direction to the rotor shaft 2, so that even if there is major compensation for variations or temperature expansion, the radial forces on the magnet ring 3 do not become excessively great, so that the magnet ring is protected against damage. At the same time, this way of securing the ring magnet provides an overload protection upon transmission of torques by means of friction locking from the rotor 1 to the armature shaft 2, and its overload threshold value is defined by the centering elements 12 in conjunction with the contact faces 14.

Figure 10:
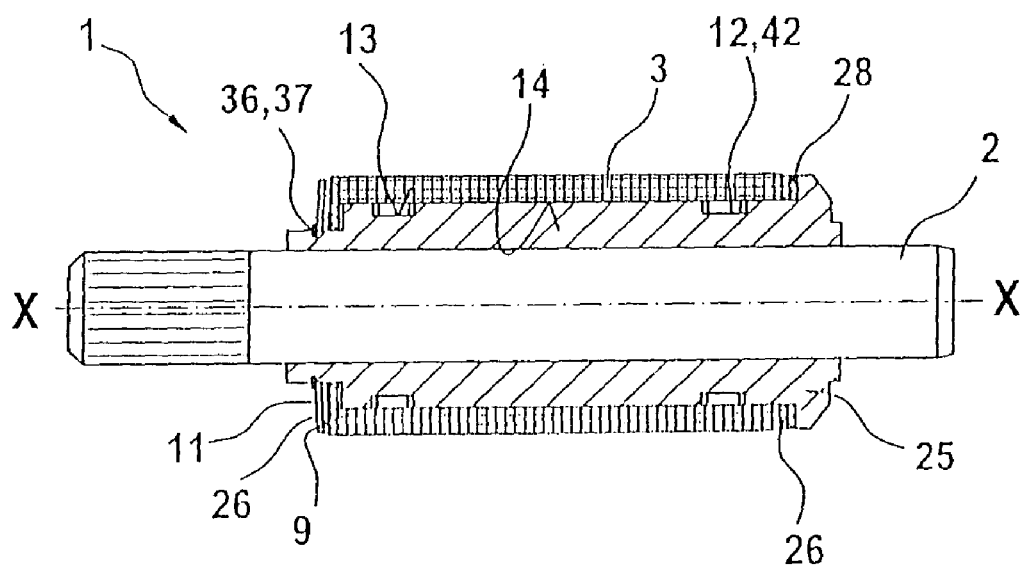
FIG. 10 is a schematic sectional view of a variation of the exemplary embodiment of FIG. 9.

The rotor shown in FIG. 10, with the retaining elements 4, 5 integrated with the rotor body 25, has in addition to the centering elements 12 an axial spring element 11, embodied here as a cup spring 11. To that end, a fixed stop 28 is integrally formed on one end of the rotor body 25 as an axial retaining element 4, against which the ring magnet 3 is pressed by the axial spring force of the spring element 11. To increase the transmission of torque, a friction disk 26, whose surface is predetermined to suit the desired friction locking, is located both between the spring element 11 and the axial contact face 9 and between the fixed stop 28 and the second contact face 9. For a high coefficient of friction, a steel disk 26 may for instance be coated with corundum or diamond. Alternatively, one or both friction disks 26 may be dispensed with, for instance if only slight torques are to be transmitted. The axial spring element 11 in this exemplary embodiment is axially secured by a securing ring 36, which is received by an annular groove 37. In a variation, the axial spring element 11 is received directly in an axial recess 13 (FIG. 7), and as a result the securing ring 36 as an additional component is omitted. By means of such an arrangement with an axial spring element 11, axial initial tension force losses, resulting from different coefficients of expansion, can also be compensated for. The rotor body 25 is embodied in FIG. 10 and FIG. 9 as a one-piece plastic body, but it may also be embodied as a magnetic short-circuit element 18, as is shown in FIG. 11.

Figure 11A:
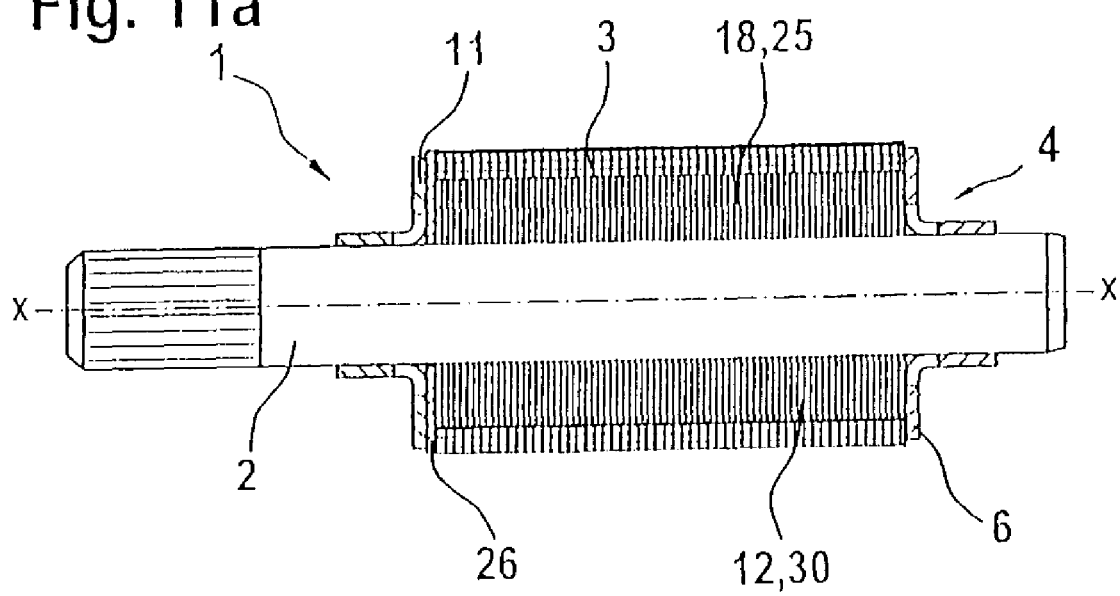
FIGS. 11a through 11c are a schematic sectional view of a further exemplary embodiment of the invention, with a radial spring package.
Figure 11B:
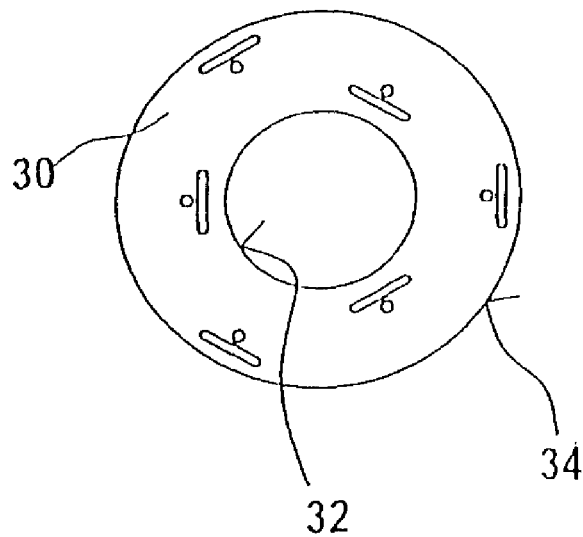
Figure 11C:
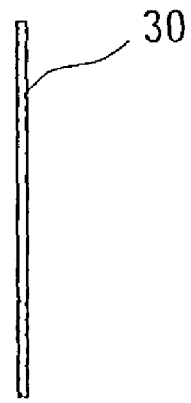

In FIG. 11, the two retaining elements 4 and 5 are embodied as cup springs 11 and solidly fixed directly to the rotor shaft 2, for instance being press-fitted on. These two axial spring elements 11 compensate for the variations in length in the manufacture of the ring magnet as well as for its thermal expansion. For radial centering, the retaining elements 4, 5 have centering elements 12, which are embodied here as a radial spring package 18 and simultaneously represent a magnetic short circuit for the permanent magnet ring 3. The centering elements 12 are formed in FIGS. 11b and 11c by individual spring laminations 30, which are braced on their inside 32 directly on the armature shaft 2 and on their inside 34 on the radial contact face 14 of the ring magnet 3. Optionally, the retaining elements 4, 5 have friction disks 26, embodied as separate components, which are located between the axial spring elements 11 and the axial contact faces 9 of the ring magnet 3.

FIGS. 12a through 12d show variants of a rotor 1 of the invention, in which the elastic support of the permanent ring magnet 3 in the axial and radial directions is achieved each by separate components of the retaining elements 4, 5. For manufacturing the rotor 1, in FIG. 12a, first a first retaining element 5 is fixed directly on the armature shaft 2 by means of a securing ring 36. A centering element 12, onto which the ring magnet 3 is slipped, is preinstalled on a recess 13 of the retaining element 5. Between the axial contact face 9 and the retaining element 4 (and/or 5), before its installation, an axial spring element 11 is put in place, which compensates for the thermal expansion and manufacturing variations in the axial direction. The axial initial tension of the spring element 11 can be set or adjusted by means of a second securing ring 36, with which the retaining element 4 is fixed. The centering elements 12 have a constant spring rate with a flat spring characteristic curve 50 over the entire operating temperature range and thus cause the outer jacket of the permanent magnet ring 3 to remain always centered exactly with respect to the axis X-X of the armature shaft 2 under conditions of different temperature expansions and manufacturing variations of the individual parts. Thus optimal concentricity and economical manufacture of the rotor 1 are assured. In FIG. 12a, the centering elements 12 are embodied as spiral springs 38, whose individual windings, at least in the relaxed state, are radially offset.

Figure 13:
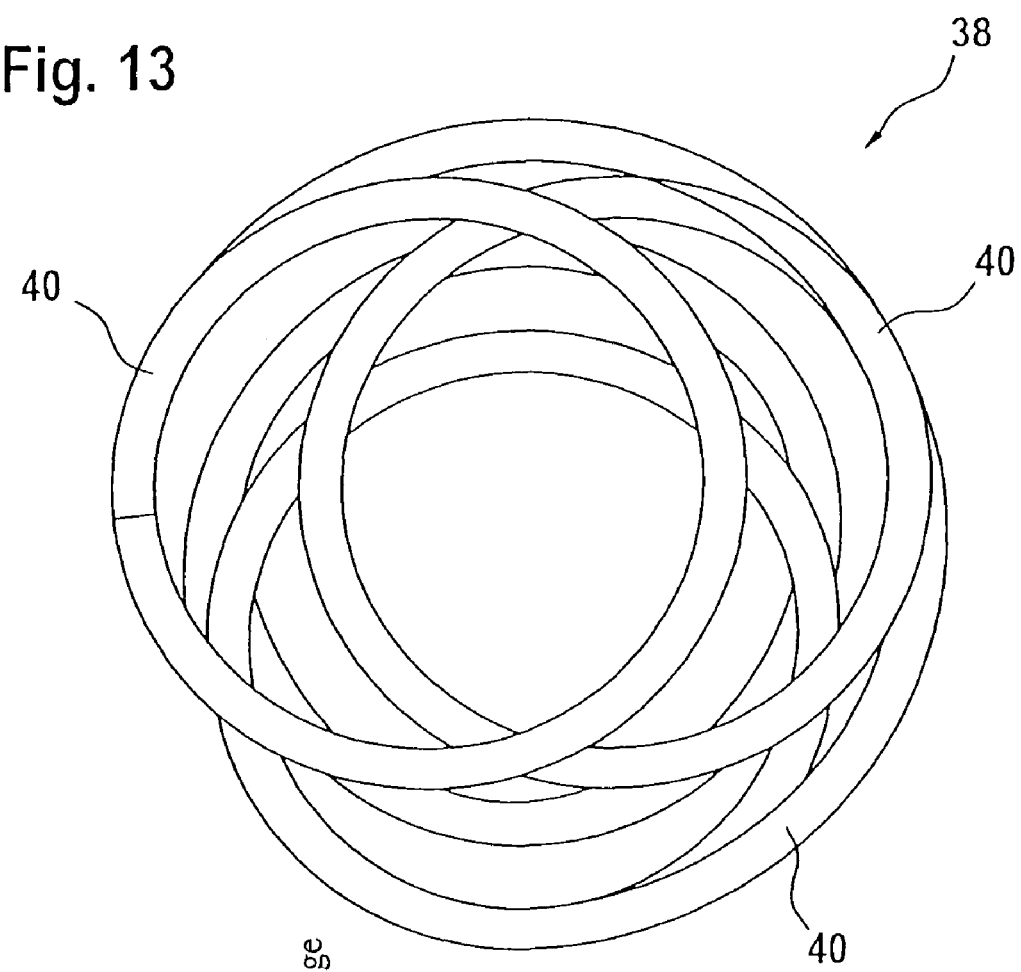
FIG. 13 shows a spiral centering element in the uninstalled state.

One such spiral spring 38 is shown in FIG. 13 as a separate component. For manufacturing such a spiral spring 38, the axially successive windings 40 are deflected alternatingly in different radial directions, so that the new outside diameter of the spiral spring 38 is greater than the diameter of a single winding 40, and the effective inside diameter is less than that of a single winding 40. The wire of a spiral spring 38 of this kind has a rectangular profile, for instance, and is preinstalled with a defined axial initial tension on the recess 13 of the retaining elements 4, 5.

In a variation, in FIG. 12b, instead of the spiral spring 38 a wavy flat spring 42 is used, which is mounted annularly on the recess 13. The wavy flat spring 42 is preferably embodied as an open ring, as is also shown in a side view in FIG. 15b—but without radially projecting tabs 54. The wavy spring ring 42, which may also be embodied as a conventional, commercially available tolerance ring 42, has a radial initial tension, so that it rests with some regions 44 on the radial contact face 14 of the ring magnet 3 and with other regions 46 on the retaining element 4, 5. For applications involving little compensation for variations or only slight differences in thermal expansion, a conventional, commercially available O-ring 47, as a centering element 12, is supported in the recess 13 in FIG. 12c, to assure a centering restoring action of the ring magnet 3.

Figure 14:
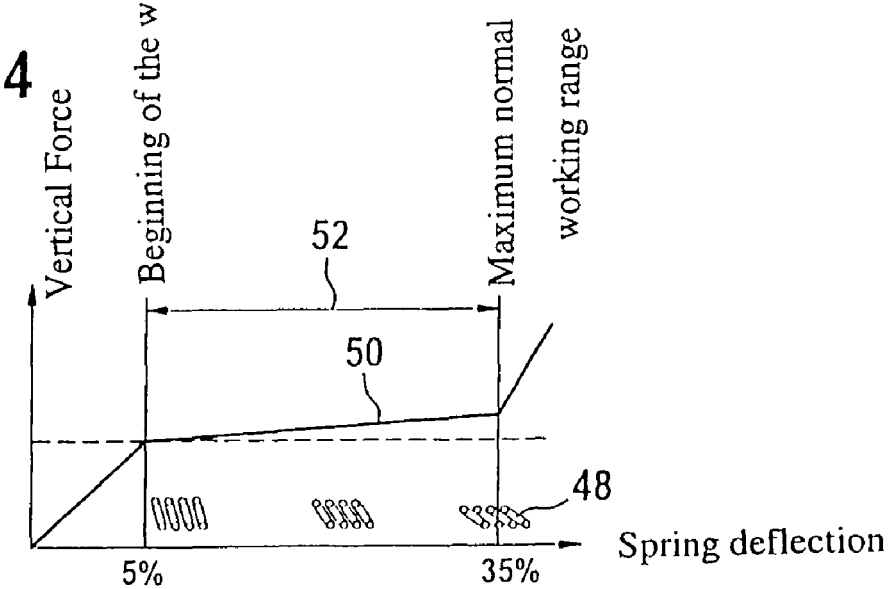
FIG. 14 shows a typical spring characteristic curve of a centering element of the invention.

In a further variation shown in FIG. 12d, the centering elements 12 are embodied as a so-called Bal seal 48. A Bal seal 48 of this kind also has a kind of spiral spring, but its windings are not radial as in FIG. 12a but rather, as shown in FIG. 14, tilted axially relative to one another. As a result, such as a Bal seal 48 has a very flat spring characteristic curve 50 over a total usable working range 52, and as a result a virtually constant restoring force exists on the magnet ring 3 over the entire radial spring travel distance of the centering elements 12. Such a flat spring characteristic curve 50 with a virtually constant restoring force can be achieved, given suitable design, by the other versions of the centering elements 12 named here as well.

The centering elements 12 of FIGS. 12a through 12d may, in further variations, also be supported on a rotor body 25 integrated with the retaining elements 4, 5, or directly on the armature shaft 2.

Figure 15A:
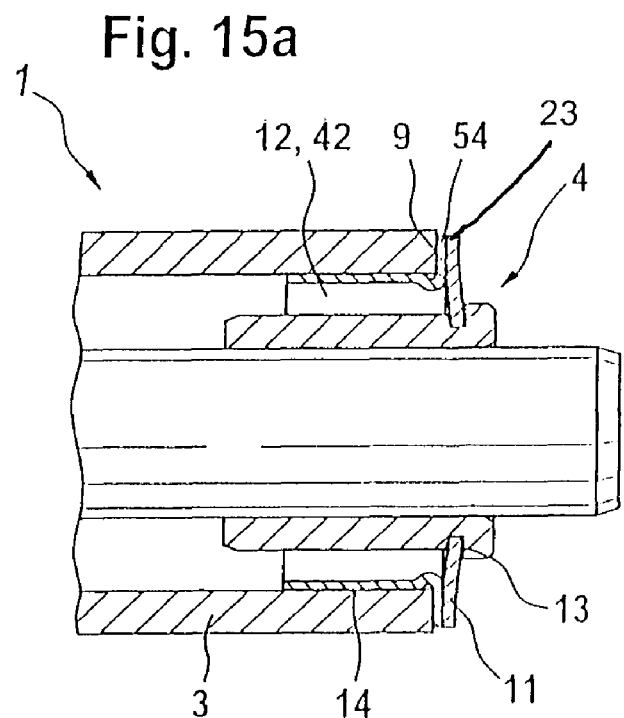
FIGS. 15a through 15h are schematic sectional and side views of further exemplary embodiments of the invention with centering elements.
Figure 15B:
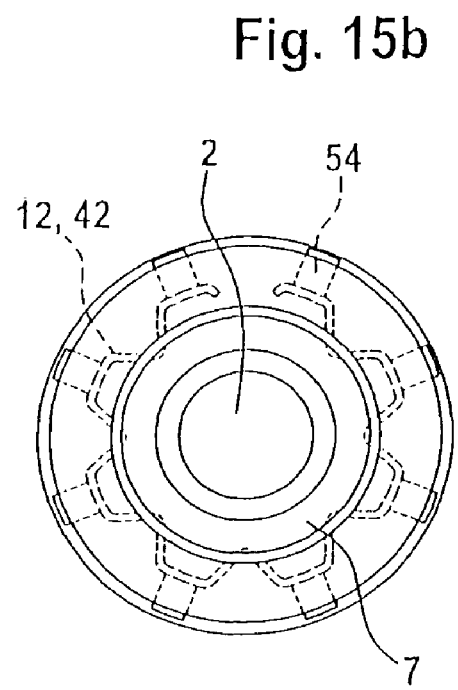

FIGS. 15a through 15h show further exemplary embodiments with variants of centering elements 12. In FIG. 15a, a wavy flat spring 42 —like that shown in FIG. 12b—is supported as a centering element 12 on the retaining element 4. However, unlike FIG. 12b, here the selected flat spring 42 has radial extensions 54, which rest on the axial contact faces 9 of the ring magnet 3. Upon installation of the ring magnet 3, this magnet is centered by the wavy flat spring 42; the stresses, frozen upon assembly, inside the axially as yet unloaded extensions 54 are very slight. Next, the retaining element 4, with the preinstalled cup spring 11, is slipped axially onto the armature shaft 2, until the radially outer regions 23 of the cup spring 11 press the extensions 54 against the axial contact face 9 of the ring magnet 3. As a result, the centering element 12 is partially reinforced in the region of the extensions 54, thereby making more-precise fixation possible over the entire temperature course. The axial spring elements 11 and the retaining elements 4, 5 are axially fixed by either force locking or form locking. In FIG. 15b, a section through the wavy flat spring 42 is shown schematically; for exerting a radial pressing force against the radial contact face 14, this spring is embodied in this exemplary embodiment as an open spring ring 42.

Figure 15C:
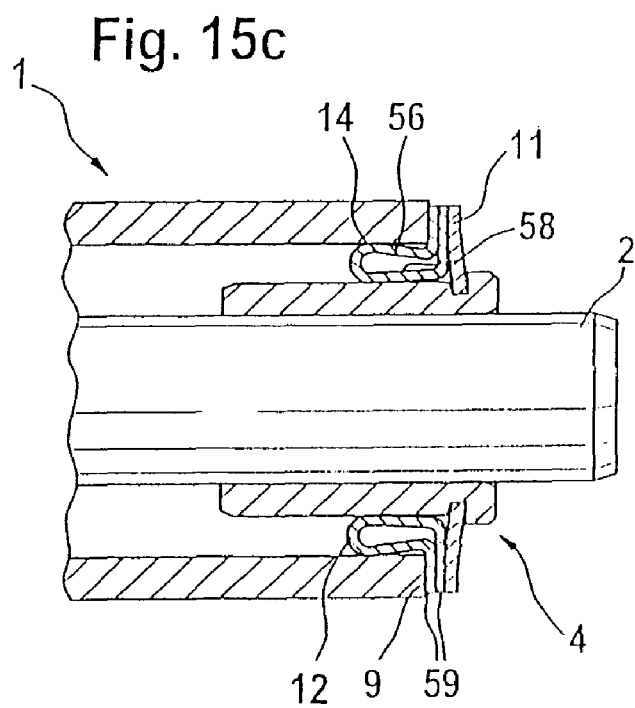
Figure 15D:
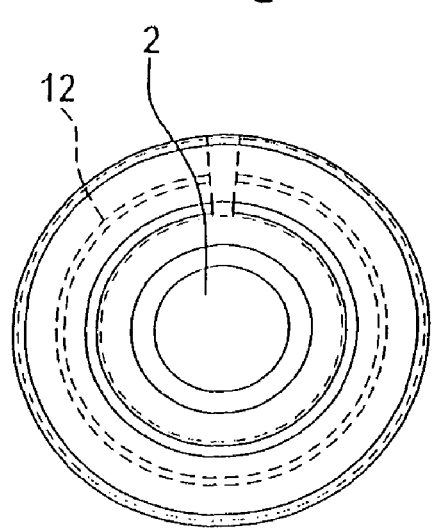

FIG. 15c shows a variation of the centering element 12, whose cross section forms a kind of loop with two legs 56 and 58, which are braced radially on the radial contact face 14 on one side and on the retaining element 4 on the other. In the radial direction, this centering element 12 has two tabs 59, resting one on top of the other, which in turn are pressed against the axial contact faces 9 of the ring magnet 3 by means of the axial spring elements 11. FIG. 15d is in turn a schematic sectional view of the centering element 12 of FIG. 15c.

Figure 15E:
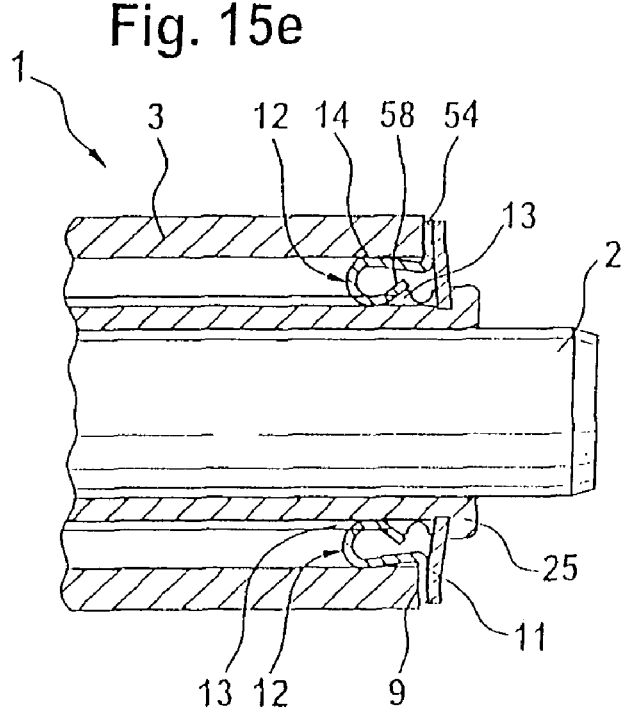
Figure 15F:
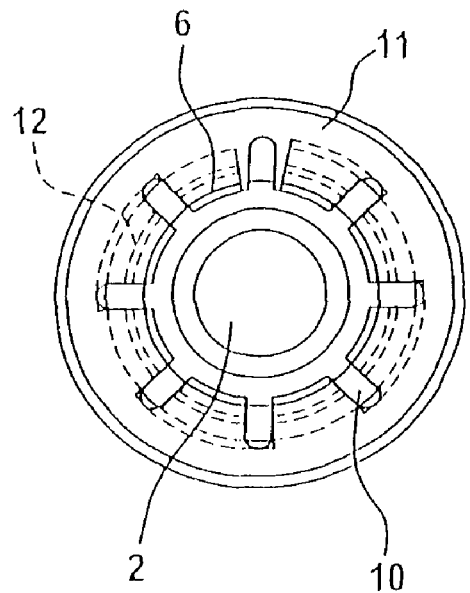

FIG. 15e shows a further variation of a centering element 12 whose cross section forms an axially open loop with a leg 58, which is braced on at least one recess 13 on a rotor body 25, which extends over the entire radial range of the ring magnet 3. Here, the retaining elements 4 and 5 are again an integral component of the rotor body 25. Also in this exemplary embodiment, a radial extension 54 is pressed against the axial contact face 9 by means of axial spring elements 11, thus partially reinforcing the centering element 12. FIG. 15f is a schematic sectional view of the exemplary embodiment of FIG. 15e, in which for better radial adaptation, the centering element 12 is again embodied as an open ring.

Figure 15G:
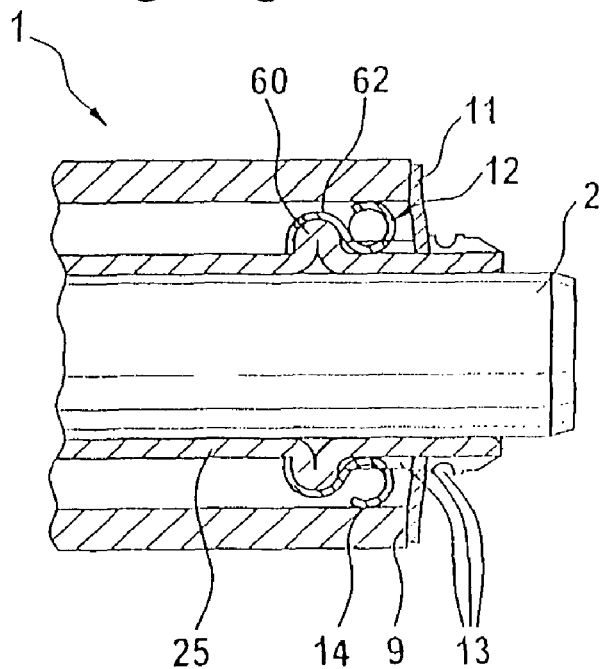
Figure 15H:
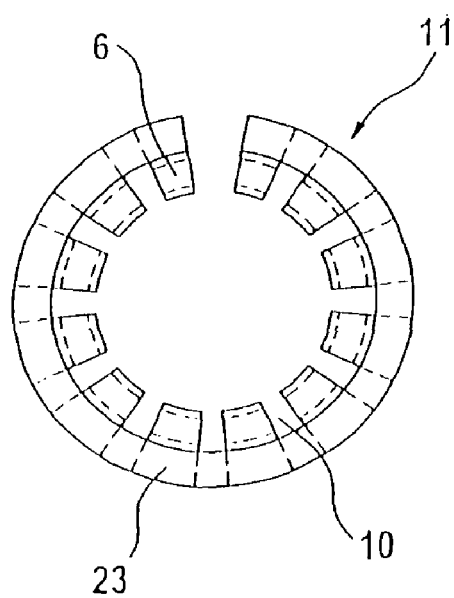

In a further embodiment of a rotor 1 of the invention shown in FIG. 15g, a rotor body 25 has an annular bead 60, on which a centering ring 12 is located with a suitable contrary recess 62. Similarly to FIG. 15e again has an open loop in cross section, whose legs 56 and 58 are braced on the axial contact face 14 and on the retaining element 4, 5 that is integrated with the rotor body 25. Since the centering element 12 is fixed three-dimensionally on the bead 60, it requires no further fixation by the axial spring element 11, which in this exemplary embodiment is braced on variably located annular grooves 13 on the retaining elements 4 and 5. FIG. 15h shows a cup spring 11 as the axial spring element 11, with axial slits 10 between the resilient regions 6; here, the resilient regions 6 are embodied radially to the armature shaft 2, in contrast to the radially outward-located resilient regions 6 in the exemplary embodiment of FIG. 1.

It should be noted that with respect to the exemplary embodiments shown in all the drawings, manifold combinations with one another are possible. In particular, the different axial support options of the permanent magnet 3 and the different radial support options of the permanent magnet 3, and in particular the different embodiment of the retaining elements 4, 5, may be combined with one another in arbitrary ways.

The foregoing relates to preferred exemplary embodiments of the invention, it being understood that other variants and embodiments thereof are possible within the spirit and scope of the invention, the latter being defined by the appended claims.

The invention claimed is:

1. An electrical machine comprising
a rotor (1)
a stator,
an essentially hollow cylindrical permanent magnet (3)
the permanent magnet (3) having axial and/or radial contact faces (9, 14), and retaining elements (4, 5) each having an integrally formed resilient region securing the permanent magnet (3) to the rotor (1) at the axial and/or radial contact faces (9, 14),
the permanent magnet (3) being elastically supported in the axial direction (X-X) and/or the radial direction of the rotor (1) by means of the retaining elements (4, 5), further comprising a disklike friction element (26) located between the contact faces (9, 14) of the permanent magnet (3) and the retaining elements (4, 5), and wherein the disklike friction elements (26) or the retaining elements (4, 5) have a steel face (28, 29) coated with corundum or diamond, and wherein the coating of corundum or diamond is located between the permanent magnet (3) and the retaining elements.

2. The electrical machine according to claim 1, wherein the resilient region (6) is located on radially outer circumferential portions of the retaining elements (4, 5), in order to brace axial contact faces (9) of the permanent magnets (3).

3. The electrical machine according to claim 1, wherein the retaining elements (4, 5) have slits (10) extending in the radial direction, in order to form individual resilient regions (6).

4. The electrical machine according to claim 1, wherein the retaining elements (4, 5) comprise axial spring elements (11) in the form of cup springs (11) for elastically supporting the permanent magnet (3).

5. The electrical machine according to claim 4, further a comprising centering element (12, 42) having an axial friction face integrally formed-on radial extensions (54) which are pressed by the axial spring element (11) against the axial stop face (9) of the permanent magnet (3).

6. The electrical machine according to claim 1, wherein a contact face of the retaining elements (4, 5) and/or a contact face (9) of the permanent magnet (3) is embodied in tapering form.

7. The electrical machine according to claim 1, wherein a contact face of the retaining element (4, 5) is embodied as a curved region with a predetermined radius (R).

8. The electrical machine according to claim 1, wherein the contact face (9, 14) of the permanent magnet (3) and/or the contact face of the retaining elements (4, 5) has a wear-resistant and/or friction-increasing coating.

9. The electrical machine according to claim 1, wherein the retaining elements (4, 5) comprise centering elements (12) which have an approximately linear spring characteristic curve extending shallowly over the entire temperature range for centering the permanent magnet (3) relative to the axial axis (X-X) and/or axially fixing the permanent magnet (3).

10. The electrical machine according to claim 9, wherein the centering elements (12) are embodied as an open or closed spring ring, wire spring, lamination spring (18), spiral spring (38), flat spring (42) with undulations all the way around, tolerance ring, compression-elastic O-ring (47), or Bal seal (48).

11. The electrical machine according to claim 10, wherein the centering element (12) is a spiral spring (38) having individual windings (40), which are offset both radially and axially.

12. The electrical machine according to claim 1, wherein the rotor further comprises a rotor body (25) located between a rotor shaft (2) and the permanent magnet (3) and embodied as a short-circuit element (18) of the permanent magnet (3).

13. The electrical machine according to claim 12, wherein the retaining elements (4, 5) are integrated with the rotor body (25).

14. The electrical machine according to claim 12, wherein the retaining elements (4, 5) or the rotor body (25) have annular recesses (37, 19, 13) extending all the way around, for receiving axial spring elements (11) and/or centering elements (12).

15. The electrical machine according to claim 12, wherein the retaining elements (4, 5) and/or the rotor body (25) are fixed on the rotor shaft (2) by means of securing rings (36), spring elements, laser welding, adhesive bonding, or shrink fitting.

16. The electrical machine according to claim 12, wherein the rotor body (25) is embodied as a radial and/or axial spring package (18).

17. The electrical machine according to claim 1, wherein the retaining elements (4, 5) are embodied as a friction coupling of a torque transmission, whose overload threshold value can be predetermined by means of the spring force and the friction faces.

18. An electrical machine comprising
a rotor (1),
a stator,
an essentially hollow cylindrical permanent magnet (3),
the permanent magnet (3) having radial contact faces (9, 14), and
retaining elements (4, 5) securing the permanent magnet (3) to the rotor (1) at the radial contact faces (9, 14),
the permanent magnet (3) being elastically supported in the radial direction of the rotor (1) by means of the retaining elements (4, 5), further comprising a disklike friction element (26) located between the contact faces (9, 14) of the permanent magnet (3) and the retaining elements (4, 5), and wherein the disklike friction elements (26) or the retaining elements (4, 5) have a steel face (28, 29) coated with corundum or diamond, and wherein the coating of corundum or diamond is located between the permanent magnet (3) and the retaining elements.

* * * * *